(12) United States Patent
Vu et al.

(10) Patent No.: US 7,928,724 B2
(45) Date of Patent: Apr. 19, 2011

(54) MAGNETIC ODOMETER WITH DIRECTION INDICATOR SYSTEMS AND METHOD

(75) Inventors: Toan Vu, Huntington Beach, CA (US); Tom Judd, Carlsbad, CA (US); Ron Fang, Cerritos, CA (US); Bruce Graham, West Covina, CA (US)

(73) Assignee: Honeywell International Inc., Morristown, NJ (US)

( * ) Notice: Subject to any disclaimer, the term of this patent is extended or adjusted under 35 U.S.C. 154(b) by 424 days.

(21) Appl. No.: 12/127,691

(22) Filed: May 27, 2008

(65) Prior Publication Data

US 2009/0295376 A1    Dec. 3, 2009

(51) Int. Cl.
*G01B 7/14* (2006.01)
*G01P 13/00* (2006.01)
*G01P 3/42* (2006.01)

(52) U.S. Cl. .................... 324/207.23; 324/165
(58) Field of Classification Search ............ 324/207.24, 324/207.25, 160, 166, 173, 174, 178, 179; 73/514.39; 384/448
See application file for complete search history.

(56) References Cited

U.S. PATENT DOCUMENTS

| | | | | |
|---|---|---|---|---|
| 5,523,679 A * | 6/1996 | Kalb | ......... | 324/165 |
| 6,084,400 A * | 7/2000 | Steinich et al. | ......... | 324/207.13 |
| 6,265,863 B1 * | 7/2001 | Kaneko | ......... | 324/160 |
| 6,282,954 B1 * | 9/2001 | Ott et al. | ......... | 73/488 |
| 6,446,005 B1 | 9/2002 | Bingeman et al. | | |
| 6,448,760 B1 * | 9/2002 | Neumann et al. | ......... | 324/207.2 |
| 6,674,280 B1 | 1/2004 | Goetz et al. | | |
| 6,779,401 B2 | 8/2004 | Montagnon | | |
| 6,830,250 B2 | 12/2004 | Cervantez et al. | | |
| 2001/0009367 A1 * | 7/2001 | Seitzer et al. | ............ | 324/207.21 |
| 2006/0142913 A1 | 6/2006 | Coffee et al. | | |
| 2006/0247847 A1 | 11/2006 | Carter et al. | | |
| 2007/0170912 A1 * | 7/2007 | Kato et al. | ............ | 324/160 |

OTHER PUBLICATIONS

Strollometer, http://www.strollometer.com/howitfits.html, The right fit, Feb. 7, 2008.
ADI and DON WEBER, Strollometer wireless stroller, http://www.amazon.com/Strollometer-Wireless-Stroller-Speedometer-speedometer/odometer, Feb. 7, 2008.

* cited by examiner

*Primary Examiner* — Kenneth J Whittington
(74) *Attorney, Agent, or Firm* — Fogg & Powers LLC

(57) ABSTRACT

Systems and methods for determining a directional movement of an object such as a wheeled vehicle. The system includes a magnet having a north pole and a south pole mounted to the object, a single magnetic sensor positioned such that the sensor can individually detect each magnetic pole as the object moves, the sensor configured to produce a first characteristic signal when a north pole is detected and a second characteristic signal when a south pole is detected, and a processing device in signal communication with the sensor, the processing device configured to determine a directional movement of the object based on a configuration of a signal doublet that includes the first and second characteristic signals. The methods include sensing the north and south poles as they pass the magnetic sensor and determining a direction based on an order in which the north and south poles are sensed.

18 Claims, 6 Drawing Sheets

US 7,928,724 B2

MAGNETIC ODOMETER WITH DIRECTION INDICATOR SYSTEMS AND METHOD

BACKGROUND OF THE INVENTION

In a dead reckoning system for wheeled applications, it is sometimes important to know the direction of travel as well as the displacement. The displacement is typically derived from the counting of odometer pulses by some means such as magnetic, optical, or direct connections to a vehicle's odometer sensors. For a wheeled application, the direction of travel is also typically very important. Generally, some other means is used to distinguish the direction of travel such as connections to a backup light signal, if one exists. In many applications, the installation of such an elaborate odometer sensor, including connections to a separate direction indicator is prohibitively expensive or not practical at all. Although systems that detect direction using magnetic sensors exist, they typically require two or more magnetic sensors to operate, such as a device described in U.S. Pat. No. 6,446,005 that uses two hall-effect magnetic sensors in a sensing component to detect direction.

SUMMARY OF THE INVENTION

The present invention includes systems and methods for determining a directional movement of an object. In an example embodiment, the system includes at least one magnet having a north pole and a south pole mounted to the object, a single magnetic sensor positioned such that the sensor can individually detect each pole of at least one magnet when at least one magnet passes by the magnetic sensor as the object moves, the sensor configured to produce a predetermined first characteristic signal when a north pole is detected and a predetermined second characteristic signal when a south pole is detected, and a processing device in signal communication with the sensor, the processing device configured to determine a directional movement of the object based on a configuration of a signal doublet that includes the first and second characteristic signals. In an example embodiment, the methods include sensing a north pole of a magnet mounted on an object as the north pole passes a single magnetic sensor, sensing a south pole of the magnet as the south pole passes the single magnetic sensor, and determining a direction selected from a first direction and a second direction opposite the first direction based on an order in which the north and south poles are sensed.

In accordance with further aspects of the invention, the invention includes a system for determining a direction of a wheeled vehicle. In an example embodiment, the system includes a chassis, a first wheel rotationally coupled to the chassis, a magnet having a north pole and a south pole mounted to the first wheel of the wheeled vehicle, a single magnetic sensor configured to produce a predetermined first characteristic signal when a north pole is detected and a predetermined second characteristic signal when a south pole is detected, and a processing device in signal communication with the magnetic sensor, the processing device configured to determine rotational direction of the first wheel and a corresponding direction of the wheeled vehicle selected from forward or reverse based on a configuration of a signal doublet that includes the first and second characteristic signals from the magnetic sensor.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
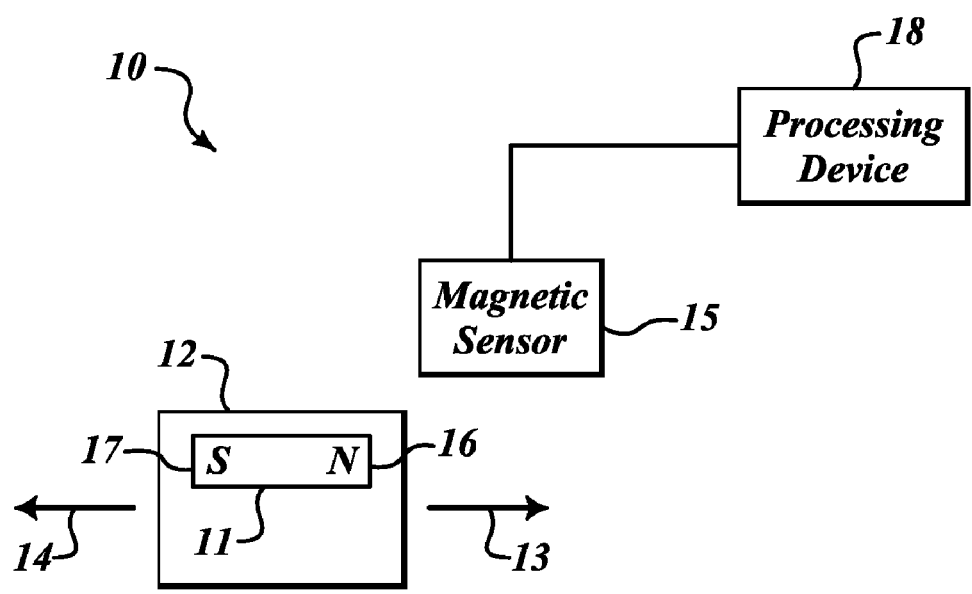
FIG. 1 is a diagram of a system formed in accordance with an embodiment of the invention for determining a movement direction of an object.

FIG. 1 is a diagram of a system 10 formed in accordance with an embodiment of the invention for determining a direction of motion of an object 12. The system 10 includes a magnet 11 mounted to the object 12. The object 12 is movable in at least a first direction 13 and a second direction 14 opposite the first direction 13. The system 10 includes a single magnetic sensor 15 that is positioned to individually detect a north pole 16 and a south pole 17 of the magnet 11 as they pass by the magnetic sensor 15. The magnetic sensor 15 is configured to produce a predetermined first characteristic signal when a north pole of a magnet such as the north pole 16 is detected and a predetermined second characteristic signal when a south pole of a magnet such as the south pole 17 is detected. The magnetic sensor 15 is in signal communication with a processing device 18. The processing device 18 is configured to determine a directional movement of the object 12 based on a configuration of a signal doublet that includes the first and second characteristic signals (See FIG. 4).

Figure 2:
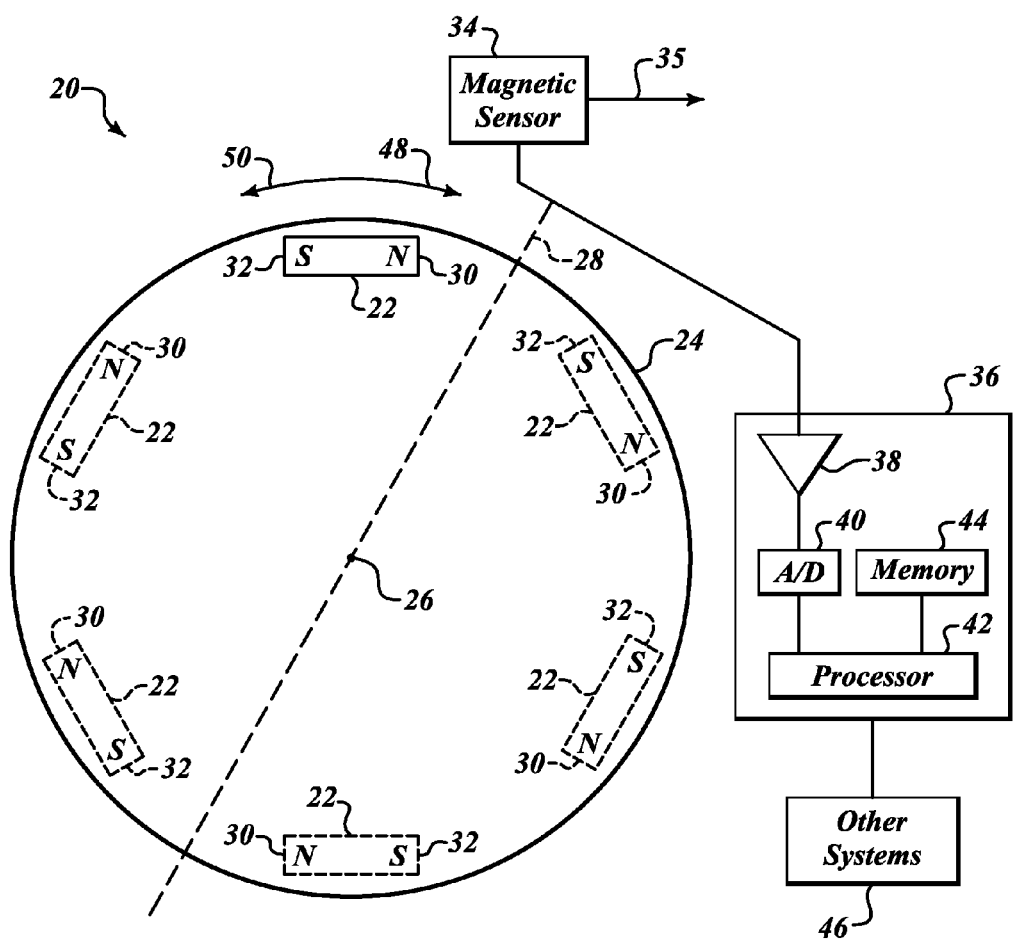
FIG. 2 is a diagram of a system for determining a rotational direction of a wheel in accordance with an embodiment of the invention.

FIG. 2 is a diagram of a system 20 for determining a rotational direction of a wheel in accordance with an embodiment of the invention. The system 20 includes at least one magnet 22 mounted to a wheel 24 having a rotational center 26 and an axis of rotation 28. Each of the magnets 22 include a north pole 30 and a south pole 32. The magnets 22 are preferably spaced at approximately equal angular intervals around the wheel 24. Each of the magnets 22 are also typically arranged such that the north pole 30 and the south pole 32 of each magnet face the same direction as the wheel 24 rotates. In some example embodiments, each of the magnets 22 may be positioned such that the north pole 30 and the south pole 32 are approximately equidistant from the rotational axis 28.

The system 20 also includes a single magnetic sensor 34 having a sensitive axis 35. The magnetic sensor 34 is positioned to individually detect each of the north pole 30 and south pole 32 of the magnets 22 when the magnets 22 pass by the magnetic sensor 34 as the wheel 24 rotates. The magnetic sensor 34 is configured to produce a predetermined first characteristic signal when the north pole 30 is detected and a predetermined second characteristic signal when the south pole 32 is detected (See FIG. 4).

The system 20 also includes a processing device 36 in signal communication with the magnetic sensor 34. In an example, the processing device 36 includes an amplifier 38 for amplifying a raw signal from the magnetic sensor 34. The amplifier 38 is in signal communication with an analog to digital converter (ADC) 40 that digitizes the amplified signal from the amplifier 38. The ADC 40 is in signal communication with a processor 42 that processes the digitized signal from the ADC 40. A memory 44 is in data communication with the processor 42. The processor 42 is configured to determine a direction of the wheel 24 and a distance traveled by the wheel 24. The processor 42 is configured to determine the direction of the wheel 24 based on a configuration of a signal doublet that includes the first and second characteristic signals in similar fashion to that described with respect to FIG. 1. The processor 42 is configured to determine a displacement or distance traveled by the wheel 24 based on an odometer pulse count. The odometer pulse count can be taken as the leading pulse in the signal doublet, the following pulse in the signal doublet, or the center of the signal doublet. The processor 42 determines the number of revolutions of the wheel 24 based on the odometer pulse count and the number of magnets 22 located on the wheel 24. The processor 42 determines the displacement based on the size (circumference) of the wheel 24, the number of doublets detected, and the number of magnets 22 mounted on the wheel. The processing device 36 is in signal communication with other systems 46 in some embodiments. The signal communication may be wired or wireless, and the other systems 46 may be systems such as navigation systems or tracking systems, for example.

Figure 3:
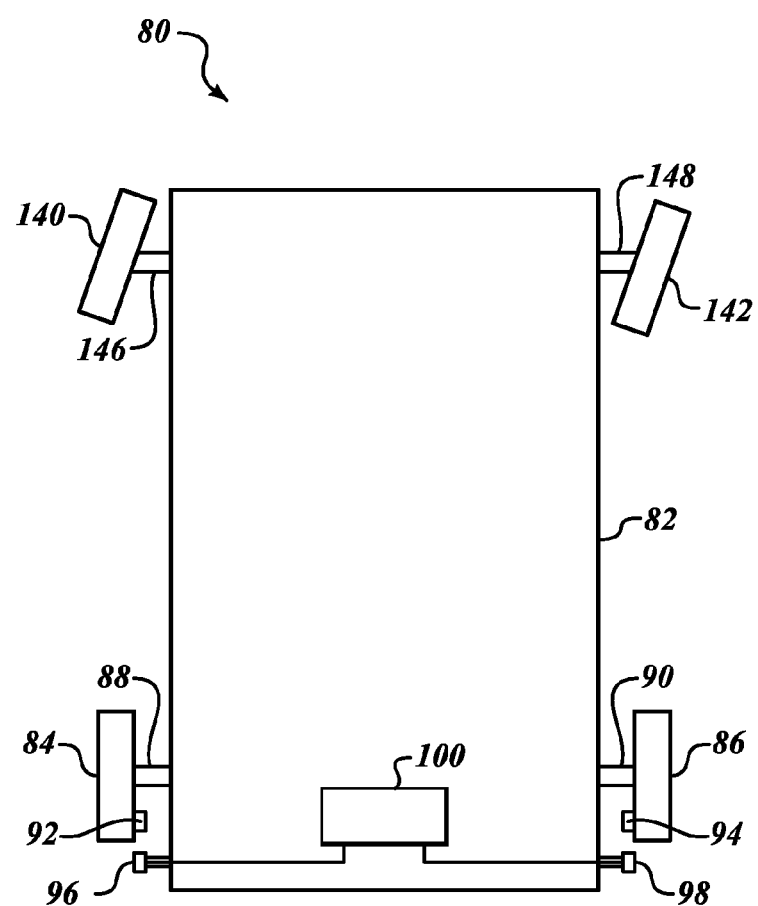
FIG. 3 is a diagram of a wheeled vehicle formed in accordance with an embodiment of the invention.

FIG. 3 is a diagram of a system 80 for determining a direction of a wheeled vehicle 81 formed in accordance with an example embodiment of the invention. The wheeled vehicle 81 may be controlled by a user or may be a robotic vehicle. The wheeled vehicle 81 may be a shopping cart, an automobile, a golf cart, a robotic lawnmower, or a robotic vacuum cleaner, for example. The wheeled vehicle 81 includes a chassis 82, a first wheel 84 rotationally coupled to the chassis 82, and a second wheel 86 rotationally coupled to the chassis 82. The first wheel 84 may be coupled to the chassis 82 with a first axle 88 and the second wheel 86 may be coupled to the chassis 82 with a second axle 90, for example. At least one first magnet 92 having a north and a south pole is mounted to the first wheel 84 and at least one second magnet 94 having a north and a south pole is mounted to the second wheel 86 in similar fashion to that described with respect to the magnet 22 and the wheel 24 shown in FIG. 2. A first single magnetic sensor 96 is positioned such that the magnetic sensor 96 can individually detect each pole of the first magnet 92 as it passes by the magnetic sensor 96 as the first wheel 84 rotates. In an example embodiment, the magnetic sensor 96 is positioned in similar fashion to that described for the magnetic sensor 35 in relation to the wheel 24 with respect to FIG. 2. In an example, the magnetic sensor 96 is coupled to the chassis 82. In similar fashion to the positioning of the magnetic sensor 96, a second single magnetic sensor 98 is positioned such that the magnetic sensor 98 can individually detect each pole of the second magnet 94 as it passes by the magnetic sensor 98 as the second wheel 86 rotates. The first and second magnetic sensors 96, 98 are each configured to produce a predetermined first characteristic signal when a north pole is detected and a predetermined second characteristic signal when a south pole is detected.

A processing device 100 is in signal communication with the first single magnetic sensor 96 and the second single magnetic sensor 98. The processing device 100 determines a rotational direction of the first wheel 84 and a corresponding direction of travel of the wheeled vehicle 81. In an example, the rotational direction of the first wheel 84 is selected from forward or reverse based on a configuration of a first signal doublet that includes the first and second characteristic signals from the first single magnetic sensor 96. The processing device 100 determines the rotational direction of the first wheel 84 based on whether the first or second characteristic signal from the first single magnetic sensor 96 appears first in the first signal doublet, for example.

In an example embodiment, the processing device 100 is further configured to determine a rotational displacement of the first and second wheels 84, 86 based on signals received from the first and second magnetic sensors 96, 98, respectively. The processing device 100 also determines a rotational direction of the second wheel 86 based on a configuration of a second signal doublet that includes the first and second characteristic signals from the second magnetic sensor 98. The processing device 100 may also determine a direction of the wheeled vehicle 81 based on the determined rotational directions and determined rotational displacements of the first and second wheels 84, 86.

In one embodiment, the processing device 100 is also further configured to determine a displacement of the wheeled vehicle 81 based on the determined direction of the wheeled vehicle 81 and the determined rotational displacements of the first and second wheels 84, 86 during a predetermined time period in some examples. The processing device 100 determines a position of the wheeled vehicle 81 based on an initial position, an initial heading, the determined displacement of the wheeled vehicle 81, and the determined direction of the wheeled vehicle 81.

In the example shown, the first wheel 84 and the second wheel 86 are rear wheels of the wheeled vehicle 81 and only rotate axially in relation to the chassis 82. The wheeled vehicle 81 also includes a first front wheel 140 and a second front wheel 142. The first front wheel 140 and the second front wheel 142 are coupled to the chassis 82 with a first front axle 146 and a second front axle 148 respectively. The first and second front wheels 140, 142 rotate axially with respect to the chassis 82 and also may be turned with respect to the chassis 82.

Figure 4:
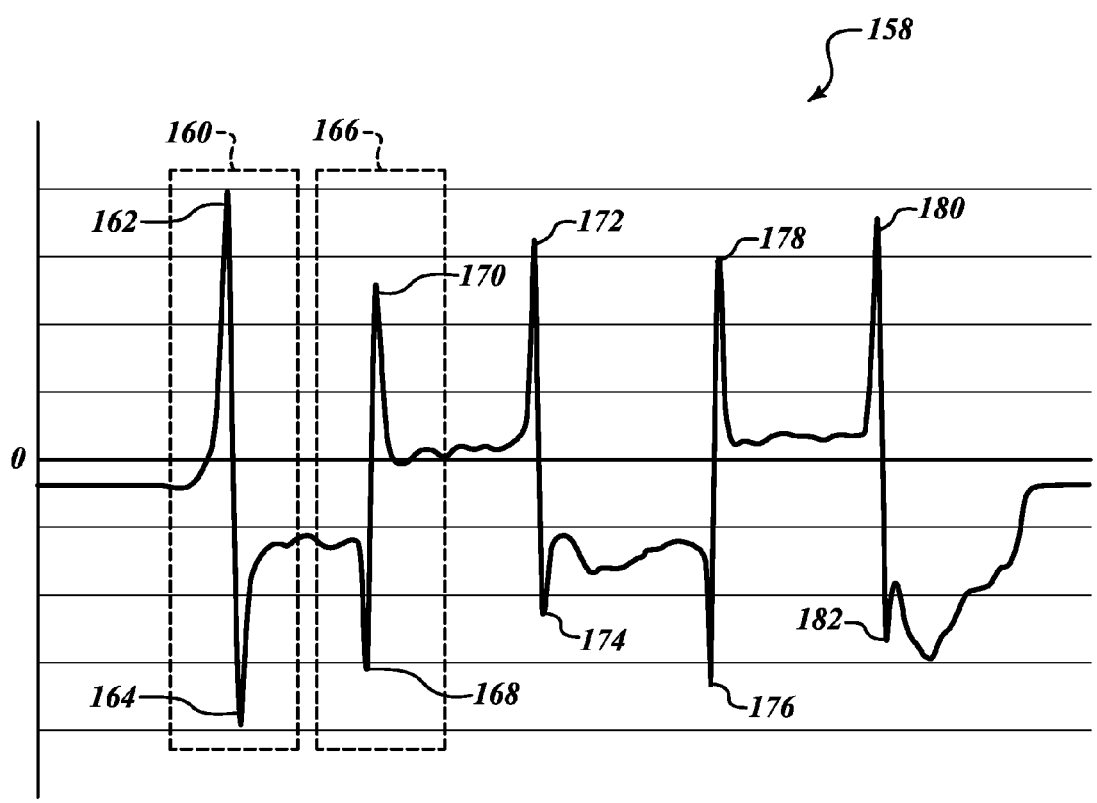
FIG. 4 is a diagram of example signals used in determining a movement direction of an object in accordance with an embodiment of the invention.

FIG. 4 is a diagram of example signals used in determining a direction of an object such as the object 12 shown in FIG. 1, the wheel 24 shown in FIG. 2, or the wheeled vehicle 81 shown in FIG. 3 in accordance with an embodiment of the invention. FIG. 4 shows an example signal trace 158, such as might be produced by a magnetic sensor such as the magnetic sensor 15 of FIG. 1, the magnetic sensor 34 of FIG. 2, or the magnetic sensors 96, 98 of FIG. 3. In the example shown, the signal trace 158 is a representation of a digital signal after amplification and analog to digital conversion of a raw signal produced by a magnetic sensor. However, the general shape and features of the signal trace 158 also reflect the characteristics of the raw analog signals produced by the magnetic sensors. The signal trace 158 includes a first signal doublet 160 that includes a first characteristic signal peak 162 and a second characteristic signal peak 164. A signal doublet represents detection of both a magnetic north pole and a magnetic south pole in a single magnet by a magnetic sensor. The signal trace 158 includes some bias with a baseline that is lower than zero. The first characteristic signal peak 162 is a positive peak that occurs at a magnitude of approximately 4. The second characteristic signal peak 164 is a negative peak that occurs at a magnitude of approximately −3.9. In an example, a magnetic sensor may be oriented such that the first characteristic signal peak 162 corresponds to detection of a magnetic north pole at its closest distance to the magnetic sensor and the second characteristic signal peak 164 corresponds to detection of a magnetic south pole at its closest distance to the magnetic sensor.

In the example shown, the horizontal axis represents time, with the first characteristic signal peak 162 appearing before the second characteristic peak 164 in the first signal doublet

160. This configuration of characteristic signals in a signal doublet corresponds to a first movement direction of an object where the north pole is detected by the magnetic sensor before the south pole. This may correspond to movement in the direction 48 shown in FIG. 2, for example. A second doublet 166 includes a characteristic signal peak 168 having a negative magnitude followed by a characteristic signal peak 170 having a positive magnitude. In this example, characteristic signal peaks having negative magnitudes represent detection of a south pole and characteristic signal peaks having positive magnitudes represent detection of a north pole. Although the characteristic signal peaks 168, 170 have magnitudes below that of the second characteristic signal peak 164 and the first characteristic signal peak 162, respectively, they are still in the form of a signal doublet with magnitudes great enough to represent detection of a south and a north pole. A predetermined signal strength threshold may be used in some examples before a characteristic signal peak is considered to represent detection of a magnetic pole. The configuration of the second signal doublet 166 corresponds to a second movement direction of an object where the south pole is detected by the magnetic sensor before the north pole. This may correspond to a reversal of direction from the direction 48 to the direction 50 shown in FIG. 2, for example.

The signal trace 158 also includes three additional signal doublets, with the first having a positive characteristic signal peak 172 followed by a negative characteristic signal peak 174. The second additional signal doublet includes a negative characteristic signal peak 176 followed by a positive characteristic signal peak 178 and the third additional signal doublet includes a positive characteristic signal peak 180 followed by a negative characteristic signal peak 182.

Figure 5:
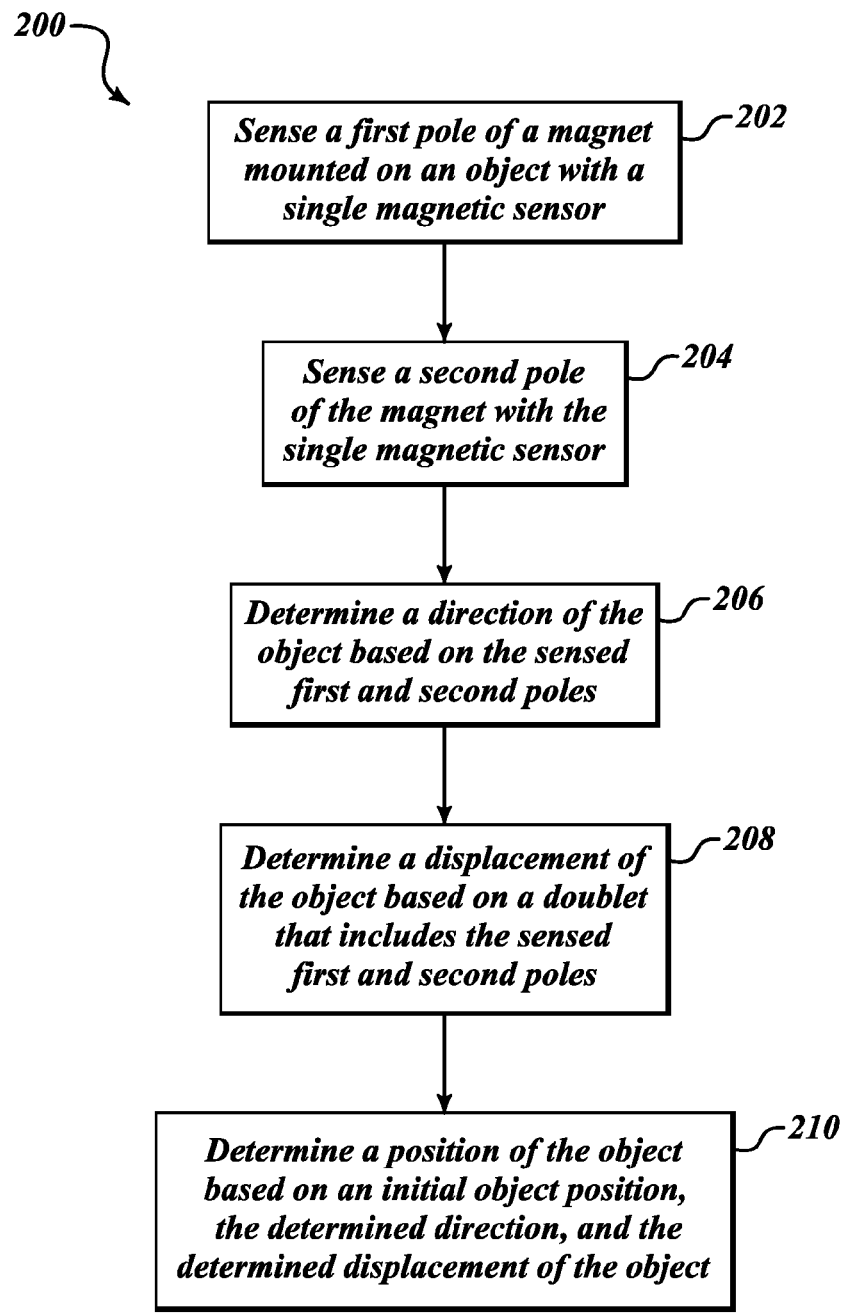
FIG. 5 is a diagram showing a flowchart of a method of determining a movement direction of an object in accordance with an embodiment of the invention.

FIG. 5 is a diagram showing a flowchart of a method 200 of determining a direction of an object in accordance with an embodiment of the invention. The object may be the object 12 shown in FIG. 1, the wheel 24 shown in FIG. 2, or the wheeled object 81 shown in FIG. 3, for example. First, at a block 202, a first pole of a magnet mounted on an object is sensed with a single magnetic sensor. The magnet may be the magnet 11 shown in FIG. 1 or the magnet 22 shown in FIG. 2, for example. The single magnetic sensor may be the magnetic sensor 15 or the magnetic sensor 34, for example. Next, at a block 204, a second pole of the magnet is sensed with the single magnetic sensor. The first pole and the second pole may be a north pole and a south pole respectively or alternatively a south pole and a north pole respectively, for example. Then, at a block 206, a direction of the object is determined based on when the first and second poles were sensed. Then, at a block 208, a displacement of the object is determined based on a doublet that includes the sensed first and second poles, and a previously determined known distance (linear or angular) between magnets or magnet if alone on a wheel. Next, at a block 210, a position of the object is determined based on an initial object position and the determined displacement of the object.

Figure 6:
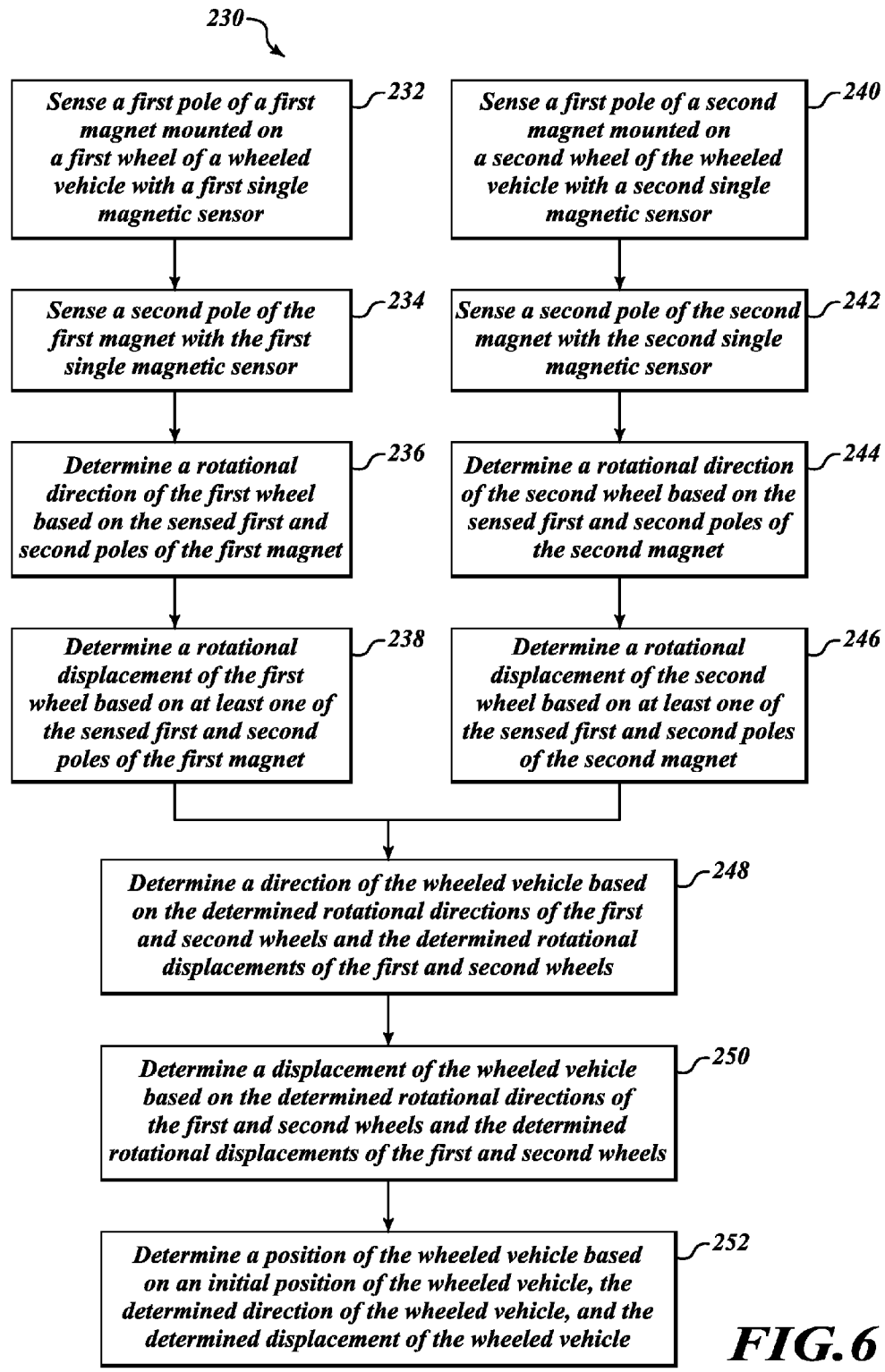
FIG. 6 is a diagram showing a flowchart of a method of determining a direction of a wheeled vehicle in accordance with an embodiment of the invention.

FIG. 6 is a diagram showing a flowchart of a method 230 of determining a direction of a wheeled vehicle in accordance with an embodiment of the invention. First, at a block 232, a first pole of a first magnet mounted on a first wheel of a wheeled vehicle is sensed with a first single magnetic sensor. The first magnet may be the magnet 92, the first wheel may be the first wheel 84, the first single magnetic sensor may be the first single magnetic sensor 96, and the wheeled vehicle may be the wheeled vehicle 81 shown in FIG. 3, for example. Next, at a block 234, a second pole of the first magnet is sensed with the first single magnetic sensor. The first pole and the second pole of the first magnet may be a north pole and a south pole respectively or alternatively a south pole and a north pole respectively, for example. Then, at a block 236, a rotational direction of the first wheel is determined based on when the first and second poles of the first magnet were sensed. Next, at a block 238, a rotational displacement of the first wheel is determined based on at least one of the sensed first and second poles of the first magnet and the known distance between magnets or magnet if alone on the wheel. Determination of the rotational direction and rotational displacement of the first wheel may be performed by the processing device 100, for example.

In an example embodiment, the method 230 also includes a series of steps that may be performed at the same time as those performed in the blocks 232, 234, 236, and 238. First, at a block 240, a first pole of a second magnet mounted on a second wheel of the wheeled vehicle is sensed with a second single magnetic sensor. The second magnet may be the magnet 94, the second wheel may be the second wheel 86, the second single magnetic sensor may be the second single magnetic sensor 98, and the wheeled vehicle may be the wheeled vehicle 81 shown in FIG. 3, for example. Next, at a block 242, a second pole of the second magnet is sensed with the second single magnetic sensor. The first pole and the second pole of the second magnet may be a north pole and a south pole respectively or alternatively a south pole and a north pole respectively, for example. Then, at a block 244, a rotational direction of the second wheel is determined based on the sensed first and second poles of the second magnet. Next, a rotational displacement of the second wheel is determined based on at least one of the sensed first and second poles of the second magnet.

In an example embodiment, the method 230 also includes a series of steps that use results of the steps performed in the blocks 232, 234, 236, 238 and the blocks 240, 242, 244, 246. At a block 248, a direction of the wheeled vehicle is determined based on the determined rotational directions of the first and second wheels and the determined rotational displacements of the first and second wheels. Then, at a block 250, a displacement of the wheeled vehicle is determined based on the determined rotational directions of the first and second wheels and the determined rotational displacements of the first and second wheels. Next, at a block 252, a position of the wheeled vehicle is determined based on an initial position of the wheeled vehicle and the determined displacement of the wheeled vehicle.

While the preferred embodiment of the invention has been illustrated and described, as noted above, many changes can be made without departing from the spirit and scope of the invention. For example, magnets may be attached to an object in a different manner than the mounting of individual magnets. A strip having multiple magnetic poles may be used, for example. Magnets may be integral to an object rather than mounted to an object, or the tracked object may be a magnet itself. Additionally, various components of the processing devices such as amplifiers and analog to digital converters may be separate components or may be integrated in the magnetic sensors rather than in the processing devices. The processing devices may be implemented using any combination of hardware and software configured to perform the processing functions. Example hardware may include microcontrollers, signal processors, field programmable gate arrays, or application specific integrated circuits. Additionally, the systems and methods may also determine the rate at which an object moves in addition to the object's displacement based on sensed magnetic poles. Accordingly, the scope of the invention is not limited by the disclosure of the pre- The embodiments of the invention in which an exclusive property or privilege is claimed are defined as follows:

1. A system for determining a directional movement of a vehicle, the system comprising:
    a first set of magnets mounted to the vehicle, wherein the first set of magnets has at least one magnet with a north pole and a south pole;
    a second set of magnets mounted to the vehicle, wherein the second set of magnets has at least one magnet with a north pole and a south pole;
    a first magnetic sensor configured to produce a signal indicating a presence of a magnetic field produced by the first set of magnets;
    a second magnetic sensor configured to produce a signal indicating a presence of a magnetic field produced by the second set of magnets; and
    a processing device in signal communication with the first and second magnetic sensors, the processing device configured to determine a direction of motion of the object based on the produced signal, wherein the determined direction is a heading not limited to forward or reverse.

2. The system of claim 1, wherein the first and second magnetic sensors are configured to produce a predetermined first characteristic signal when a north pole is detected and a predetermined second characteristic signal when a south pole is detected, and wherein the processing device is configured to determine the direction of motion based on a configuration of a signal doublet, wherein the signal doublet includes the first and second characteristic signals.

3. The system of claim 2, wherein the first characteristic signal includes a first voltage and the second characteristic signal includes a second voltage, wherein the first and second voltages are not equal.

4. The system of claim 2, wherein the processing device is configured to determine a direction based on whether the first or second characteristic signal appears first in the signal doublet.

5. The system of claim 2, wherein the processing device is further configured to determine a displacement of the object during a predetermined time period based on signals received from the magnetic sensor.

6. The system of claim 5, wherein the processing device is further configured to determine a position of the object based on an initial position of the object, the determined direction of the object, and the determined displacement of the object.

7. The system of claim 2, wherein the vehicle is a wheeled vehicle, the first set of magnets is mounted to a first wheel and the second set of magnets is mounted to a second wheel, such that the north poles and the south poles of the first and second sets of magets are approximately equidistant from a rotational axis of the first and second wheels, and the processing device is configured to determine a rotational direction of the first and second wheels.

8. The system of claim 7, wherein the first and second sets of magnets include a plurality of magnets mounted to the first and second wheels such that the north and south poles of all of the plurality of magnets are oriented in a similar fashion.

9. A system for determining a direction of a wheeled vehicle, the system comprising:
    a chassis;
    a first wheel rotationally coupled to the chassis;
    a second wheel rotationally coupled to the chassis;
    a first magnet having a north pole and a south pole mounted to the first wheel of the wheeled vehicle;
    a second magnet having a north pole and a south pole mounted to the second wheel of the wheeled vehicle;
    a first single magnetic sensor configured to produce a first signal indicating a presence of a magnetic field produced by the north or south pole of the first magnet;
    a second single magnetic sensor configured to produce a second signal indicating a presence of a magnetic field produced by the north or south pole of the second magnet; and
    a processing device in signal communication with the first single magnetic sensor and the second single magnetic sensor, the processing device configured to determine a first rotational direction of the first wheel and a second rotational direction of the second wheel and a corresponding direction of the wheeled vehicle based on the first and second produced signals, wherein the corresponding direction of the wheeled vehicle is a heading not limited to forward or reverse.

10. The system of claim 9, wherein the first and second magnetic sensors are configured to produce a predetermined first characteristic signal when a north pole is detected and a predetermined second characteristic signal when a south pole is detected, and wherein the processing device is configured to determine the first rotational direction of the first wheel, the second rotational direction of the second wheel, and a corresponding direction of the wheeled vehicle based on a configuration of a first signal doublet and a second signal doublet, wherein the first and second signal doublets include the first and second characteristic signals.

11. The system of claim 10, wherein the processing device is configured to determine the first rotational direction of the first wheel and the second rotational direction of the second wheel based on whether the first or second characteristic signal appears first in the first and second signal doublets.

12. The system of claim 11, wherein the processing device is further configured to determine a displacement of the wheeled vehicle based on the determined direction of the wheeled vehicle and the determined rotational displacements of the first and second wheels during a predetermined time period.

13. The system of claim 12, wherein the processing device is further configured to determine a position of the vehicle based on an initial position, an initial heading, the determined displacement of the vehicle, and the determined direction of the vehicle.

14. A method for determining a direction of a vehicle, the method comprising:
    sensing a first pole of a first magnet mounted on the vehicle as the first pole passes a first single magnetic sensor;
    sensing a second pole of the first magnet as the second pole passes the first single magnetic sensor;
    sensing a first pole of a second magnet mounted on the vehicle as the first pole passes a second single magnetic sensor;
    sensing a second pole of the second magnet as the second pole passes the second single magnetic sensor; and
    determining a direction of the object based on an order in which the first and second poles of the first and second magnets are sensed, wherein the determined direction is a heading not limited to forward or reverse.

15. The method of claim 14, further comprising:
    determining a displacement of the vehicle based on a doublet that includes the sensed first and second poles of the first and second magnets.

16. The method of claim 15, further comprising determining a position of the vehicle based on an initial position, the determined direction of the vehicle, and the determined displacement of the vehicle.

17. The method of claim 14, wherein the vehicle is a wheeled vehicle having a chassis and a first wheel rotationally coupled to the chassis, a second wheel rotationally coupled to the chassis, and wherein the first magnet is mounted on the first wheel of the vehicle, the second magnet is mounted on the second wheel of the vehicle, and wherein determining the direction comprises determining a first rotational displacement of the first wheel based on signals from the first magnetic sensor and determining a second rotational displacement of the second wheel based on signals from the second magnetic sensor.

18. The method of claim 17, further comprising:
determining a displacement of the vehicle based on the first and second determined rotational displacements of the first and second wheels; and
determining a position of the vehicle based on an initial position, the determined direction and the determined displacement of the vehicle.

* * * * *